US012760777B2

(12) United States Patent
Di Bello

(10) Patent No.: US 12,760,777 B2
(45) Date of Patent: Oct. 13, 2026

(54) SYSTEM FOR THE PROCESSING OF POWDER MATERIAL AND ASSOCIATED LUMP BREAKER DEVICE, IN PARTICULAR FOR A PRODUCTION PLANT OF BRAKE PADS

(71) Applicant: ITT ITALIA S.R.L., Lainate (IT)

(72) Inventor: Massimo Di Bello, Lainate (IT)

(73) Assignee: ITT ITALIA S.R.L., Lainate (IT)

( * ) Notice: Subject to any disclaimer, the term of this patent is extended or adjusted under 35 U.S.C. 154(b) by 53 days.

(21) Appl. No.: 19/101,482

(22) PCT Filed: Jul. 28, 2023

(86) PCT No.: PCT/IB2023/057705
§ 371 (c)(1),
(2) Date: Feb. 5, 2025

(87) PCT Pub. No.: WO2024/028728
PCT Pub. Date: Feb. 8, 2024

(65) Prior Publication Data

US 2026/0043449 A1 Feb. 12, 2026

(30) Foreign Application Priority Data

Aug. 5, 2022 (IT) ........................ 102022000016875

(51) Int. Cl.
*B02C 4/28* (2006.01)
*B02C 4/10* (2006.01)
(Continued)

(52) U.S. Cl.
CPC ............ *F16D 69/0408* (2013.01); *B02C 4/10* (2013.01); *B02C 4/286* (2013.01); *B02C 4/30* (2013.01);
(Continued)

(58) Field of Classification Search
CPC ............................ B02C 4/283; B02C 4/10–26
See application file for complete search history.

(56) References Cited

U.S. PATENT DOCUMENTS 11,298,705 B2 * 4/2022 Doppstadt ........... B02C 18/0084
2016/0214895 A1 7/2016 Van Strien et al.

FOREIGN PATENT DOCUMENTS

KR 101831705 B1 2/2018
WO 0027216 A1 5/2000
WO 2016129886 A1 8/2016

OTHER PUBLICATIONS

International Search Report and Written Opinion issued in corresponding International Application No. PCT/IB2023/057705 dated Aug. 31, 2023 (12 pages).

* cited by examiner

*Primary Examiner* — Atul P. Khare
(74) *Attorney, Agent, or Firm* — Carter, DeLuca & Farrell, LLP; George Likourezos; Bret P. Shapiro

(57) ABSTRACT

A system for processing a powder material like e.g. a friction material, including a weighting device for the powder material and an extruder to feed the powder material to a lump breaker device arranged immediately downstream the extruder to let a completely pulverized material to fall into a hopper arranged over the weighting device the lump breaker device including a rotating drum arranged transversely the extruder and delimited by a lateral surface provided with a plurality of depressions preferably spoon-like, on the whole extension thereof; the lateral surface being arranged immediately adjacent an outlet end of the extruder and being rotated toward the outlet end from upside down.

12 Claims, 3 Drawing Sheets

(51) Int. Cl.

| | |
|---|---|
| ***B02C 4/30*** | (2006.01) |
| ***F16D 65/092*** | (2006.01) |
| ***F16D 69/04*** | (2006.01) |
| *F16D 65/04* | (2006.01) |

(52) U.S. Cl.
CPC .... *F16D 65/092* (2013.01); *F16D 2069/0491* (2013.01); *F16D 2250/0092* (2013.01)

SYSTEM FOR THE PROCESSING OF POWDER MATERIAL AND ASSOCIATED LUMP BREAKER DEVICE, IN PARTICULAR FOR A PRODUCTION PLANT OF BRAKE PADS

CROSS-REFERENCE TO RELATED APPLICATIONS

This application is a National Stage Application under 35 U.S.C. § 371 (a) of PCT/IB2023/057705, filed on Jul. 28, 2023, which claims the benefit of and priority to Italian Patent Application No. 102022000016875 filed on Aug. 5, 2022, the entire contents of which are incorporated by reference herein.

TECHNICAL FIELD

The present invention relates to a system for the processing of powder material, e.g. partially dried powder mixtures or compositions, especially but not limitedly consisting in friction mixtures intended for production of friction material blocks to be used in brake elements for vehicles, like brake pads or brake shoes.

The present invention also relates to an associated lump breaker device, in particular intended for use in a production plant of brake elements, like brake shoes or brake pads, in particular brake pads, exiting a mixing step in which the various components of a mixture of raw materials for production of underlayers or of friction material blocks are mixed together to be successively extruded and divided in portions precisely weighted before molding from each portion a block of friction material and/or a respective underlayer thereof.

Here and below in the present disclosure, the term “system” is to be intended in the meaning of “plant” or “set of cooperating or operatively associated devices”.

Prior Art

The braking elements for vehicles generally comprise a friction material block and a support therefor, e.g. a metal plate, to which the friction material block is bonded, e.g. by gluing or other methods, preferably with the interposition of an insulating and damping element, known as “underlayer”.

The friction material block is obtained by molding under specific temperature and pressure condition a mixture of raw materials, which is prepared by means of one of a number of mixer devices well known in the art. After the raw friction material mixture has been prepared and before it may be molded in a friction material block, the mixture has to be divided into portions, each weighted such as each portion is intended to produce one single friction material block.

This operation is carried out by feeding the raw friction material mixture by means of an extruder to a known weighting device, which stops momentarily the extruder each time the required quantity of raw friction material mixture is collected on a scale collecting plate.

Unfortunately, a semi-dried or a wet or semi-wet powder material of any kind tends to form lumps of random dimension. So, also the raw friction material mixture tends to form lumps of unpredictable dimension. The same happens for the powdered raw materials for production of the underlayer.

In order to limit/attenuate this phenomenon, in front of the extruder is normally placed a device intended to break the lumps into smaller ones. However, the currently used breaker device, consisting in a fan partially shielded by a carter and rotating around an axis parallel to the extrusion direction, is often unable to break the lumps into sufficiently smaller ones and has moreover the tendency to project part of the extruded material it receives from the extruder far away the hopper which collect the powder material, letting it to fall onto, and being collected by, the scale plate of the weighting device.

The same problem may arise anytime when even a different powder material mixture is prepared and used to mold, e.g. the underlayer.

It is clear that, if a relatively big lump drops on the scale plate before or immediately after that the weighting device stops the extruder, a too large quantity of powder material may be collected giving rise to an overweighting phenomenon, wherein a quantity of powder material exceeding the working tolerances is fed, e.g. in the case of friction material or underlayer mix, to the molding step, what brings to obtain in the end a defective product, e.g. weighting too much and/or not having the required physical-chemical properties.

This brings to routinely obtain in the current manufacturing processes a relatively large number of friction material blocks (or underlayers), which are overweight, increasing the manufacturing costs due to e.g. the necessity to remove the excess of friction material compound by grinding, and to the unnecessary waste of raw material. Moreover, the overweighting may render the manufacturing process more complex to be controlled and may produce in the end a quantity of scraps which may not be reworked and which may be difficult or impossible to recycle.

SUMMARY OF THE INVENTION

It is an object of the present invention to provide an enhanced system for processing powder materials, e.g. partially dried powder mixtures or compositions, especially but not exclusively raw friction material compositions or component materials thereof, which is free of the drawbacks of the prior art and especially allow to divide the powdered material into separate portions and weight such portions with sufficient precision to avoid scraps or further working operations.

It is further an object of the present invention to provide an enhanced lump breaker device able to be used in such a processing system to efficiently break the lumps present in a powdered material coming from an extruder into smaller particles, in particular sufficiently small to avoid the overweighting phenomenon.

According to the present invention a System for processing powder materials, especially, but not exclusively, a powder material consisting in mixtures intended for production of underlayers or of friction material blocks for brake elements, like brake pads or brake shoes, and an associated lump breaker device are provided as defined in the appended claims.

In particular, the system according to the invention, wherein, here and below, the term “system” is intended to mean “plant” or “set of cooperating or operatively associated devices”, comprises a weighting device configured to receive and weight onto a collecting element thereof a predetermined quantity of the powder material, a feeding device configured to cause a flow of the powder material being directed towards the collecting element, a control unit configured to stop the feeding device in response to a signal generated by the weighting device when the collecting element thereof receives a predetermined quantity of the powder material or is close to receive such predetermined quantity thereof and a lump breaker device arranged immediately downstream the feeding device with reference to a moving direction of the flow of powder material and upstream the collecting element.

The feeding device may consist in an extruder and the lump breaker device according to the invention comprises a rotating drum arranged in front of an outlet end of the feeding device and adjacent thereto, configured to intercept the whole flow of powder material which is caused by the feeding device to hit a lateral surface of the drum.

The lump breaker device also comprises a motor arranged on one side (i.e. aside one end) of the drum and configured to rotate the drum in e.g. a clockwise direction and anyway towards the outlet end of the feeding device from upside down.

The lateral surface of the drum is provided with a plurality of depressions on the whole extension thereof; most preferably these depressions are spoon-like shaped and the drum is arranged transversely at the outlet end of the feeding device where the flow of powder material comes out to fall on the weighting device, the rotating axis of the drum being arranged substantially perpendicular to the moving direction of the flow of powder material, i.e. perpendicular to the extrusion direction.

In case of the production of brake elements like brake pads or brake shoes, the processing system according to the invention may further comprise at least one mixer configured to receive a number of different raw materials which may be solid, in powder or particle form and dry or wet, or in liquid form, and to mix them together to obtain the powder material to be processed, preferably having a predetermined degree of humidity, the mixer being configured to feed the powder material so obtained to the feeding device consisting of an extruder.

The processing system according to the invention may further comprise a hopper arranged beneath the drum, a rotating axis of the drum being arranged substantially horizontal, the hopper being configured to collect the flow of powder material falling by gravity from the drum, or projected towards the hopper by the rotation of the lateral surface of the drum, and guide the powder material to fall on or within the collecting element.

According to a preferred embodiment, the processing system of the invention may also comprise an L-shaped shield or screen, e.g. consisting in a carter partially surrounding the drum. The L-shaped shield is arranged immediately downstream the drum, with reference to the moving direction of the flow of powder material, and in particular the shield is arranged on the side of the drum opposite to the extruder, behind and at least partly beneath the drum, such as to project with a lower end thereof partly within the hopper.

Moreover, the shield is arranged immediately adjacent the lateral surface of the drum provided with the spoon-like depressions.

The processing system of this disclosure may also comprise at least a molding station configured to receive the predetermined quantity of powder material from the weighting device to mold an underlayer and/or a block of friction material, preferably on a metallic support, the underlayer and/or friction material block being designed to compose together a brake element for a vehicle, e.g. a brake pad or a brake shoe.

The lateral surface of the drum is preferably cylindrical and the spoon-like depressions have an at least partially curved perimeter profile and are shaped, looking perpendicularly to the lateral surface of the drum, like slots or buttonholes. Moreover, the spoon-like depressions are delimited towards the rotation axis of the drum by an at least partially curved bottom wall and/or by at least partially curved sidewalls.

According to a preferred embodiment, the spoon-like depressions may have an elongated shape and are arranged all parallel to each other with respective longer sides thereof arranged parallel to the rotation axis of the drum.

The length of the longer sides of the spoon-like depressions may be, preferably, around 1.5 times the width thereof measured substantially perpendicular to the rotation axis of the drum and the depth of the spoon-like depressions may be around the same of their width.

According to a preferred embodiment, the drum or at least the lateral surface thereof provided with the spoon-like depressions may be made of a polyamide, preferably a cast polyamide6 charged with a lubrication oil.

BRIEF DESCRIPTION OF DRAWINGS

A preferred but not limiting embodiment of the invention will be now described in more detail with reference to a practical working example of implementation thereof which is solely intended to disclose in a non-exhaustive and not limiting manner the feature which are part of the content of the present disclosure, and with reference to the figures of the attached drawings, in which.

DETAILED DESCRIPTION

Figure 1:
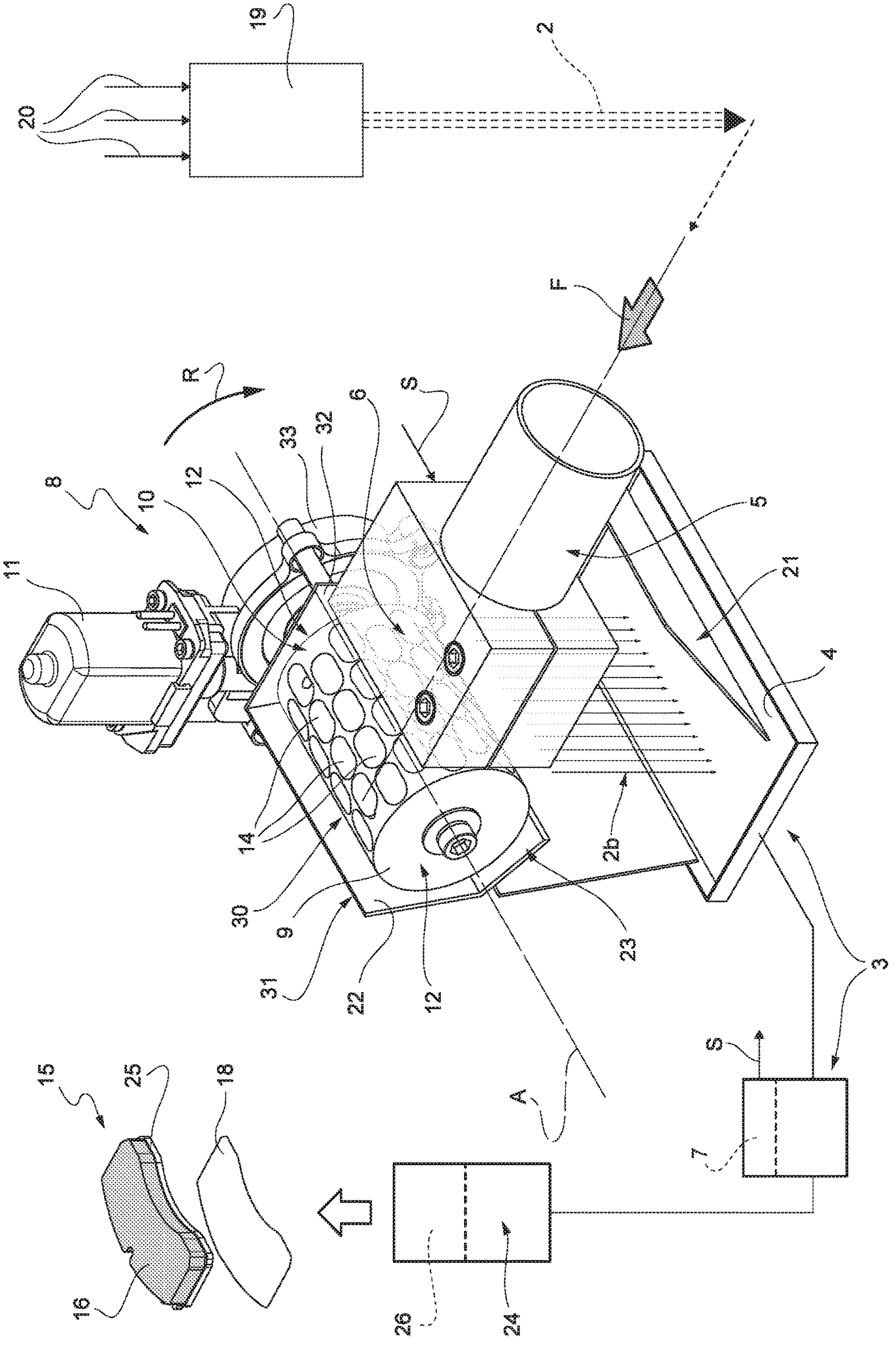
FIG. 1 shows in a schematic way a processing system according to an embodiment of the invention, adapted to process powder materials, e.g. partially dried powder mixtures or compositions like a friction material or underlayer composition, wherein some known components thereof are shown as blocks for sake of simplicity and wherein an enhanced lump breaker device according to the invention is schematically illustrated in a three-quarter axonometric view from one side and the above.

With reference to figures from 1 to 4, the reference number 1 indicates as a whole (FIG. 1) a processing system or plant for processing any kind of powder material 2, especially when the powder material is not completely dry, the powder material 2 being of any known type and being schematically shown in dotted lines in FIG. 1.

Preferably, but not exclusively, the powder material 2 to be treated by the processing system 1 is a friction material mixture intended for production of friction material blocks for brake elements, like brake pads or brake shoes, of a mixture intended for production of an underlayer thereof.

The processing system 1 comprises a known weighting device 3 partially illustrated by a block, configured to receive and weight onto a collecting element 4 thereof, e.g. a scale plate or a hollow container, a predetermined quantity of the powder material 2.

The processing system 1 also comprises a known feeding device 5 configured to cause a flow F (indicated by an arrow in FIG. 1) of the powder material 2 to move towards the collecting element 4 of the weighting device 3. The feeding device preferably consists of any known type of extruder 5, comprising an outlet end 6 from which the powder material flow F may exit the extruder 5 toward the weighting device 3.

The system 1 may also comprise a known control unit 7 (indicated in dotted line in FIG. 1 as part of the weighting device 3) configured to stop the feeding device (extruder) 5 in response to a signal S (indicated by an arrow in FIG. 1) generated by the weighting device 3 when the collecting element 4 thereof receives thereon/therein the desired predetermined quantity of powder material 2, or is close to receive such predetermined quantity of powder material 2.

In the latter case, even if the signal S is generated in feedback, the extruder 5 may be stopped before the quantity of powder material 2 present on the collecting element 4 may exceed the desired quantity, provided that in the flow F exiting the extruder 5 were not be present lumps of powder material snug together (known and not shown for sake of simplicity) and that may be of unpredictable dimension, so that their falling onto the collecting element 4 would easily cause an undesired overweighting of the powder material 2 collected in the collecting element 4.

To avoid such an event, in the processing systems known in the art, a rotating device is interposed between the feeding device 5 and the collecting element 4 to possibly intercept the lumps eventually present in the flow F.

According to a main aspect of the invention, the known rotating devices of the prior art are replaced by an enhanced lump breaker device 8 arranged immediately downstream the feeding device 5.

Here and below the terms "downstream" and "upstream" are referred to the moving direction of the flow F of powder material 2 entering and exiting the extruder 5, indicated by the point of the arrow in FIG. 1.

The lump breaker device 8 comprises a rotating drum 9 arranged just in front of the outlet end 6 of the feeding device 5 and adjacent to it, in order to be able to intercept the whole flow F of powder material 2 exiting the outlet end 6. To this purpose, the feeding device or extruder 5 is configured to cause the whole flow F of powder material 2 to hit a lateral surface 10 of the drum 9.

Figure 4:
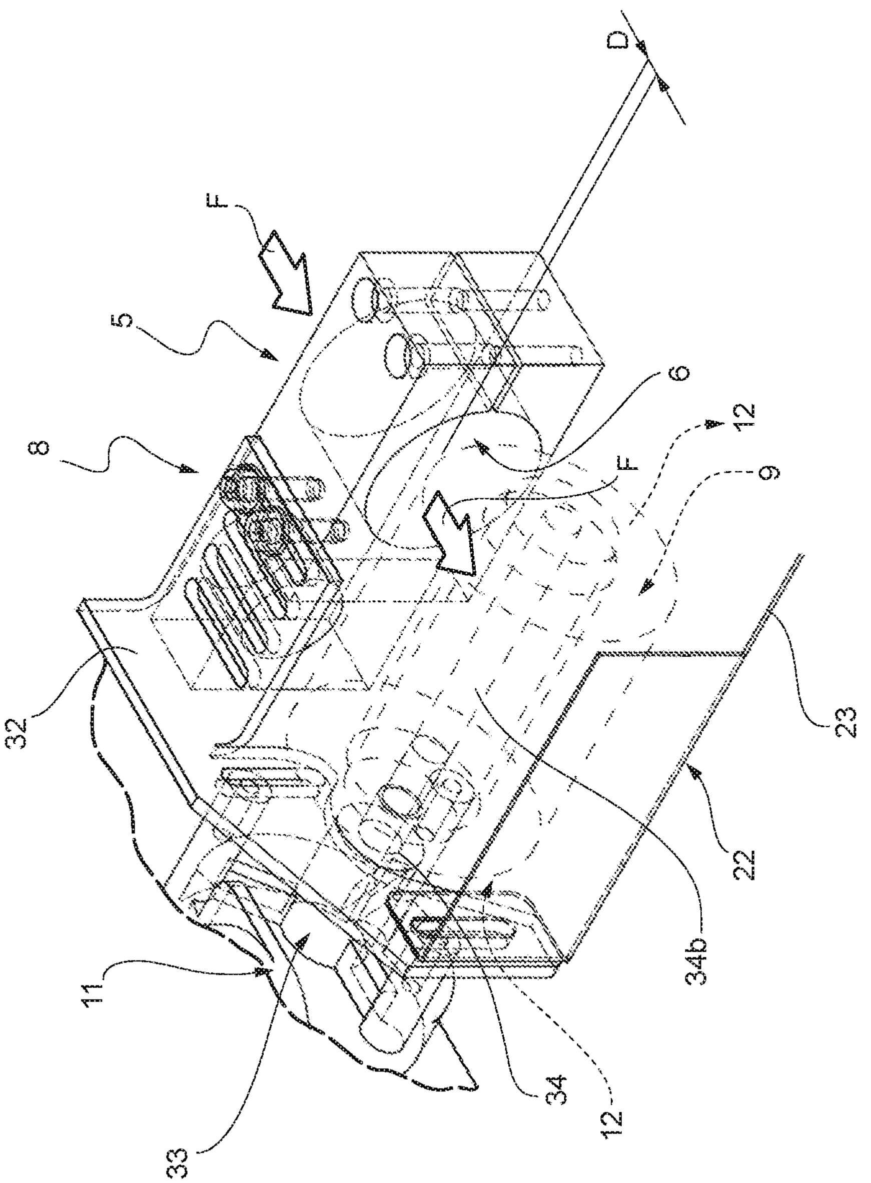
FIG. 4 shows schematically an overall axonometric view of the essential components of the processing system of the invention showing the way to assembly them.

This is also obtained by the fact that the drum 9 is arranged at a distance D (FIG. 4) from the outlet end 6 of the extruder 5 sufficiently small, namely comprised between 1 and 3 mm.

The breaker device 8 also comprises a motor 11, e.g. any kind of known electric motor, arranged on one side of the drum 9, specifically aside one of the opposite axial ends 12 of drum 9, and configured to rotate the drum 9 in a clockwise direction, in the non-limiting embodiment shown, towards the outlet end 6 of the feeding device 5 and, more generally and anyway, towards the outlet end 6 of the feeding device 5 from upside down, as shown by the arrow indicated as R in FIG. 1.

According to one main aspect of the invention, the lateral surface 10 of the drum 9 is provided with a plurality of depressions or shallow recesses 14 on the whole extension thereof.

Such depressions or shallow recesses are preferably spoon-like shaped, in order to be able to easily receive, cut and discharge the powder material projected by the feeding device/extruder 5.

Again with reference to FIG. 1, when the powder material 2 to be processed is designed to produce brake elements like brake pads 15 or friction material blocks 16 and/or an underlayer 18 therefor, the processing system 1 may further comprise at least one mixer 19 of any known type (indicated schematically by a block) configured to receive a number of different raw materials 20 which may be solid, in powder or particle form and dry or wet, or in liquid form (e.g. water or process solutions), and to mix them together to obtain the powder material 2 to be processed.

The processing system 1 is particularly aimed to process a powder material 2 having a predetermined degree of humidity and for such a reason more easily subjected to the formation of lumps.

In any case, the mixer 19 is configured to feed the powder material 2 to the extruder 5, as shown in FIG. 1.

Moreover, the processing system 1 may also comprise a hopper 21 (only schematically shown in FIG. 1) arranged beneath the drum 9.

In particular, a rotating axis A of the drum 9 (which is also its axis of symmetry) is arranged in use substantially horizontal and the hopper 21 is configured to collect the flow F of powder material 2 after the latter has hit the surface 10, when it falls by gravity from the drum 9 in the hopper 21 or is projected towards the hopper 21 by the rotation of the lateral surface 10 of the drum 9.

The hopper 21 is also configured to guide the powder material 2 to fall on, or within, the collecting element 4, which, in the non-limiting example shown, consists of a scale plate. For this purpose, it is arranged over the weighting device 3.

The processing system 1 according to the invention may also preferably comprise an L-shaped shield 22 arranged immediately downstream the drum 9 and on the longitudinal flank or side of the drum 9 opposite to the extruder 5, behind and at least partly beneath the drum 9, such as to project with a lower end 23 thereof partly within the upper part of the hopper 21.

The L-shaped shield 22 is moreover arranged immediately adjacent the lateral surface 10 of the drum 9, at a distance therefrom comparable with the distance D.

In case of powder material 2 designed to produce brake pads 15, the processing system 1 may also comprise at least a known molding station 24 configured to receive the desired predetermined quantity of powder material 2 from the weighting device 3 (after the control unit 7 has detected the reaching of the desired weight of powder material 2 onto the scale plate 4) to mold an underlayer 18 and/or a block 16 of friction material, preferably on a metallic support 25, the underlayer 18 and friction material block 16 being designed to compose a brake element 15 for a vehicle, e.g. a brake pad or a brake shoe.

In this case, downstream the molding station 24 may be provided one or more finishing stations 26 (indicated in dotted lines in FIG. 1).

In any case, and according one aspect of the invention, the drum 9 is arranged transversely at the outlet end 6 of the feeding device 5, outlet end 6 where the flow F of powder material 2 comes out to fall on the weighting device 3.

Moreover, the rotating axis A of the drum 9 is arranged substantially perpendicular to the moving direction of flow F of powder material 2, indicated by the point of the arrow in FIG. 1, i.e. transverse the flow F and the direction of extrusion of the device 5.

Figure 3:
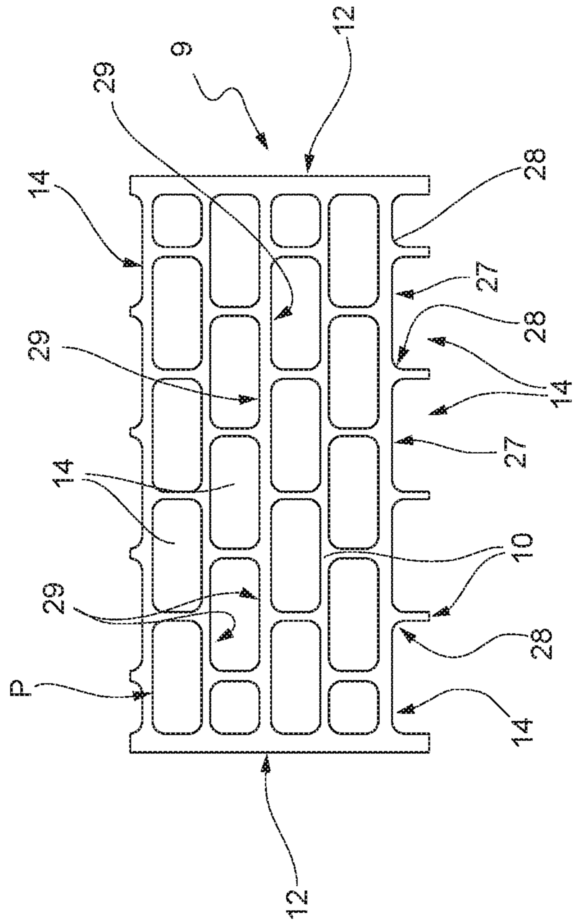
FIG. 3 shows schematically in an enlarged scale a plant view from the above of the same component shown in FIG. 2, wherein some construction details thereof may be appreciated.

According to one preferred embodiment, the depressions 14 are not only spoon-like shaped, but have also an at least partially curved perimeter profile P (FIG. 3) and, looking perpendicularly to the lateral surface 10 of the drum 9, appear to be shaped like slots or buttonholes, as well shown in FIG. 3. More preferably, the lateral surface 10 of the drum 9 is cylindrical.

The depressions 14 are preferably delimited towards the rotation axis A of the drum 9 by an at least partially curved bottom wall 27 and/or by at least partially curved sidewalls 28.

In any case, according to a preferred embodiment, the depressions 14 have an elongated shape and are arranged all parallel to each other and with the rotation axis A; in particular, they are arranged all parallel to each other with respective longer sides 29 thereof arranged parallel to the rotation axis A of the drum 9.

Moreover, according to a preferred embodiment, the length of the longer sides 29 of the depressions 14 is around 1.5 times the width thereof, measured substantially perpendicular to the rotation axis A of the drum 9.

According to a further preferred embodiment, the depth of the depressions 14 is around the same of their width.

In preferred embodiments, the drum 9 or at least the lateral surface 10 thereof provided with spoon-like depressions 14 is made of a polyamide, preferably a cast polyamide6 charged with a lubrication oil, readily available on the market for different uses. The depressions 14 may be obtained onto the surface 10 by molding or may be machined. It is however clear that the drum 9 or at least the lateral surface 10 thereof provided with the depressions 14, preferably but not exclusively of a spoon-like shape, may be obtained in a material different from a polyamide, e.g. in a different polymer of any suitable kind or even in a suitable metal, e.g. steel, bronze a light alloy, eventually coated with a thin PTFE layer (or a layer made of any other anti-stick and low friction material).

From the above description, it is clear that the present invention also covers a lump breaker device like device 8 for processing a (any) powder material 2, especially but not exclusively a friction material mixture intended for production of friction material blocks for brake elements, like brake pads or brake shoes, or a mixture intended for production of underlayers thereof, comprising:

a rotating drum 9 configured to be arranged in use in front of an outlet end 6 of an extrusion device 5 for the powder material 2, the drum 9 being delimited by a lateral surface 10 thereof configured to be hit in use by the powdered material 2 and which is preferably cylindrical;

a motor 11 arranged on one side of the t drum 9, specifically aside one end 12 thereof, and configured to rotate the drum 9 around a rotating axis A of symmetry thereof arranged substantially horizontal, the motor 11 being configured to rotate the drum 9 in a direction such as the lateral surface 10 of the drum 9 crosses in use the outlet end 6 of the extrusion device 5 from upside down;

a plurality of depressions 14, preferably spoon-like, arranged evenly on the lateral surface 10 of the drum 9 for the whole extension thereof.

Figure 2:
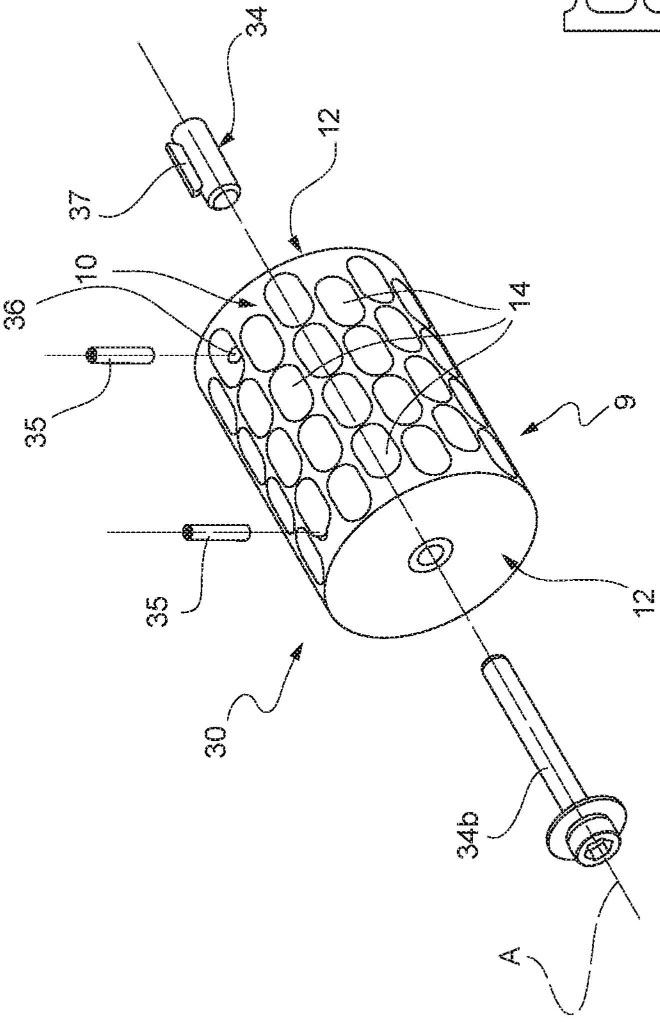
FIG. 2 shows schematically a three-quarter axonometric view of an essential component of the lump breaker device of FIG. 1.

In preferred embodiments, the breaker device 8 comprises an L-shaped shield 22 arranged along and parallel the rotation axis A of the drum 9, at a first longitudinal side 30 of the drum 9 (FIGS. 1 and 2), adjacent to the lateral surface 10 of the drum 9.

The L-shaped shield 22 is arranged with a lower end 23 thereof at least in part beneath the drum 9 and the motor 11 is configured to rotate the drum 9 in a direction (shown by an arrow R in FIG. 1) such as the lateral surface 10 of the drum 9 travels substantially parallel to the shield 22 and moving forward away from an upper end 31 of the L-shaped shield 22 arranged substantially vertical and opposite to the lower end 23 thereof.

In particular, the rotation of the drum 9 is to be directed bottom up toward the L-shaped shield 22 and its upper end 31.

In preferred embodiments, as already stated, the drum 9 or at least the lateral surface 10 thereof is made of a suitable polymer, preferably a polyamide, more preferably a cast polyamide6 charged with a lubrication oil, and the depressions 14 provided on the cylindrical surface 10 have a spoon-like and elongated shape and are arranged all parallel to each other with respective longer sides 29 thereof arranged parallel to the rotation axis A of the drum 9.

Moreover, the depressions 14, especially when spoon-like shaped, may have an at least partially curved perimeter profile P.

In this manner, the cylindrical-shaped roller/drum 9 milled with rounded slots/depression 14 breaks the lumps eventually present in the powder material 2 to be processed, irrespective of their dimension, making a finely crumbled powder material **2*b* (FIG. 1) fall vertically into the scale plate 4**.

The spoon shape of the slots/depressions 14 cuts the lumps present in the powder material 2 arriving from the extruder 5 and discharges it in small portions into the scale plate 4.

Practical tests have been carried out by the technical people of the Applicant using a test system identical to that one as described and with this system, precise and repetitive weighing has always been obtained, for any type of material and density, without inconvenience for production and waste during production changes.

Finally, in order to allow a rapid replacement of the drum 9, e.g. for servicing or for changing the drum with another one of different diameter/dimension to adapt to different quantities of powder material 2 to be precisely weighted in order to produce e.g. different models of brake pads, the drum 9 is mounted in cantilever fashion extending perpendicular from a mounting bracket 32 (FIGS. 1 and 4) to which are also attached the motor 11 and a transmission gear 33 to transmit power from motor 11 to a shaft 34 (FIGS. 2 and 4) supported idling by the bracket 32.

Drum 9 is supported by a shaft extension **34*b* slidingly inserted axially within the drum 9 and connected rigidly but in a detachable manner with shaft 34. The angular connection between drum 9 and the shaft extension 34*b* is obtained, in the non-limiting embodiment shown, by means of two threaded pins (grains) 35 (FIG. 2) inserted radially in drum 9 perpendicularly to the surface 10, through respective through holes 36 provided at the bottom of a respective depression 14, such as the pins 35 engages respective key seats 37 provided in shaft 34**.

All the aims of the present disclosure are therefore fulfilled.

Certain Terminology

Although certain braking devices, systems, and methods have been disclosed in the context of certain example embodiments, it will be understood by those skilled in the art that the scope of this disclosure extends beyond the specifically disclosed embodiments to other alternative embodiments and/or uses of the embodiments and certain modifications and equivalents thereof, like brake shows for braking systems based on brake drums. Use with any structure is expressly within the scope of this invention. Various features and aspects of the disclosed embodiments can be combined with or substituted for one another in order to form varying modes of the assembly. The scope of this disclosure should not be limited by the particular disclosed embodiments described herein.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Unless stated otherwise, the terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. Likewise, the term "generally" as used herein represents a value, amount, or characteristic that predominantly includes or tends toward a particular value, amount, or characteristic.

This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

The invention claimed is:

1. A system for processing a powder material, the powder material consisting in a friction material or a friction material mixture for production of a friction material block for brake elements, or a mixture for production of an underlayer for brake elements, the brake elements being brake pads or brake shoes, the system comprising:

a weighting device configured to receive and weight onto a collecting element thereof a predetermined quantity of the powder material;

a feeding device configured to cause a flow of said powder material towards the collecting element of the weighting device;

a control unit configured to stop the feeding device in response to a signal generated by the weighting device when the collecting element thereof receives said predetermined quantity or is close to receiving said predetermined quantity; and a rotating device interposed between the feeding device and the collecting element to intercept lumps present in the flow of said powder material;

wherein said rotating device consists of a lump breaker device arranged immediately downstream the feeding device, with reference to a moving direction of said flow of powder material, the lump breaker device comprising:

i) a rotating drum arranged in front of an outlet end of the feeding device and adjacent thereto, in order to intercept an entirety of the flow of powder material, the feeding device being configured to cause the entire flow of powder material to hit a lateral surface of the drum;

ii) a motor arranged on one side of the drum and configured to rotate the drum towards the outlet end of the feeding device upside down;

iii) a plurality of depressions arranged on a whole extension of the lateral surface of the drum; and iv) an L-shaped shield arranged along a rotation axis of the drum at a first longitudinal side of the drum and adjacent to the lateral surface of the drum, the L-shaped shield being arranged with a lower end thereof at least in part beneath the drum.

2. The system according to claim 1, wherein the feeding device consists of an extruder, the system further comprising:

at least one mixer configured to receive a number of different raw materials in solid, powder, or particle form and in dry, wet, or liquid form, and to mix the different raw materials together to obtain said powder material with a predetermined degree of humidity, the mixer being configured to feed the powder material to the extruder; and a hopper arranged beneath the drum, the rotation axis of the drum being arranged substantially horizontal, the hopper being configured to collect said flow of powder material falling by gravity from the drum, or projected towards the hopper by the rotation of the lateral surface of the drum, and guide the powder material to fall on or within said collecting element;

wherein the L-shaped shield is arranged immediately downstream the drum, with reference to the moving direction of said flow of powder material, the shield being arranged on a side of the drum opposite to the extruder, behind and at least partly beneath the drum, to project with a lower end thereof partly within the hopper, and the shield being arranged immediately adjacent to the lateral surface of the drum.

3. The system according to claim 2, further comprising at least a molding station configured to receive said predetermined quantity of powder material from the weighting device to mold the underlayer or the block of friction material on a metallic support, said underlayer or friction material block being designed to compose a brake element for a vehicle including a brake pad or a brake shoe.

4. The system according to claim 1, wherein said drum is arranged transversely at the outlet of the feeding device where the flow of powder material comes out to fall on the weighting device, the rotation axis of the drum being arranged substantially perpendicular to said moving direction of said flow of powder material.

5. The system according to claim 1, wherein said depressions are spoon-like and have an at least partially curved perimeter profile, being shaped, looking perpendicularly to said lateral surface of the drum, like slots or buttonholes; said lateral surface of the drum being cylindrical.

6. The system according to claim 1, wherein said depressions are delimited towards said rotation axis of the drum by an at least partially curved bottom wall and/or by at least partially curved sidewalls.

7. The system according to claim 1, wherein said depressions have an elongated shape and are arranged all parallel to each other with respective longer sides thereof arranged parallel to said rotation axis of the drum.

8. The system according to claim 7, wherein the length of the longer sides of the depressions are around 1.5 times the width thereof measured substantially perpendicular the rotation axis of the drum; and the depth of the depressions is essentially the same as the width thereof.

9. The system according to claim 1, wherein said drum or at least said lateral surface thereof provided with said depressions is made of a polyamide.

10. A lump breaker device for processing a powder material consisting of a friction material or friction material mixture for production of a friction material block for brake elements, including brake pads or brake shoes, or a mixture for production of an underlayer thereof, the lump breaker device comprising:

i) a rotating drum configured to be arranged in use in front of an outlet end of an extrusion device for the powder material, the drum being delimited by a lateral surface thereof configured to be hit in use by the powdered material;

ii) a motor arranged on one side of the drum and configured to rotate the drum around a rotation axis thereof arranged substantially horizontal, the motor being configured to rotate the drum in a direction such as the lateral surface of the drum crosses in use the outlet end of the extrusion device from upside down;

iii) a plurality of depressions arranged evenly on the lateral surface of the drum for the whole extension thereof; and iv) an L-shaped shield arranged along a rotation axis of the drum at a first longitudinal side of the drum and adjacent to the lateral surface of the drum, the L-shaped shield being arranged with a lower end thereof at least in part beneath the drum.

11. The lump breaker device according to claim 10, wherein the motor is configured to rotate the drum in a direction such that the lateral surface of the drum travels substantially parallel to the shield and moves forward away from an upper end of the L-shaped shield arranged substantially vertical and opposite to said lower end thereof, the rotation of the drum being directed bottom up toward the L-shaped shield.

12. The lump breaker device according to claim 10, wherein said drum or at least said lateral surface thereof is provided with the depressions as spoon-like depressions and is made of a cast polyamide charged with a lubrication oil; said spoon-like depressions having an elongated shape and being arranged all parallel to each other with respective longer sides thereof arranged parallel to said rotation axis of the drum; said spoon-like depressions having an at least a partially curved perimeter profile and said lateral surface of the drum being cylindrical.

* * * * *